United States Patent [19]

Ueda et al.

[11] Patent Number: 4,714,089
[45] Date of Patent: Dec. 22, 1987

[54] ELECTROMAGNETIC PROPORTIONAL CONTROL VALVE

[75] Inventors: Kazuhiro Ueda; Toshiaki Yamaguchi; Kouji Kajiyama, all of Wakayama; Osamu Matsumoto, Himeji, all of Japan

[73] Assignee: Mitsubishi Denki Kabushiki Kaisha, Tokyo, Japan

[21] Appl. No.: 901,369

[22] Filed: Aug. 28, 1986

[30] Foreign Application Priority Data

Oct. 3, 1985 [JP] Japan ................................ 60-220643

[51] Int. Cl.[4] .................... F16K 31/06; F16K 47/08
[52] U.S. Cl. .................. 137/614.18; 251/129.08; 251/129.14; 251/121
[58] Field of Search ............... 251/129.14, 129.08, 251/121; 137/614.18

[56] References Cited

U.S. PATENT DOCUMENTS 3,107,893 10/1963 Bashe ..................... 251/129.14 X
3,471,119 10/1969 Risk ....................... 251/129.14 X
3,861,643 1/1975 Moffatt ....................... 251/129.08
3,887,162 6/1975 Antoni et al. ............ 251/129.14 X

FOREIGN PATENT DOCUMENTS 2618874 4/1976 Fed. Rep. of Germany .
3144709 11/1981 Fed. Rep. of Germany .
3503785 2/1985 Fed. Rep. of Germany .
2498285 1/1981 France .
57-204381 12/1982 Japan .

Primary Examiner—Arnold Rosenthal
Attorney, Agent, or Firm—Oblon, Fisher, Spivak, McClelland, & Maier

[57] ABSTRACT

An electromagnetic proportional control valve of a construction having a sleeve; a spool slidably held within the sleeve; a spring holder to move with the spool; a ball mounted in the spring holder and lifted up thereby; and a valve seat inserted under pressure into the sleeve, the ball being brought into tight contact with the valve seat by the energizing force of the spring.

4 Claims, 3 Drawing Figures

ELECTROMAGNETIC PROPORTIONAL CONTROL VALVE

BACKGROUND OF THE INVENTION

The present invention relates to a control valve, and, more particularly, it is concerned with an electromagnetic control valve which proportionately controls the flow-rate of a fluid by electrical means.

Heretofore, this type of electromagnetic proportional control valve was of such a construction as shown in FIG. 3 of the accompanying drawing. In more detail, in FIG. 3, the electromagnetic proportional control valve generally designated by a reference numeral 1 is mainly constructed with an electromagnetic control section 2 and a flow-rate control section 3. The electromagnetic control section 2 is to control the flow-rate of a fluid at the flow-rate control section 3 to be described later, and is constructed with a plunger 4 as a movable part which is in contact with a spool 17 disposed at one end of the plunger in its axial direction (the bottom end side in the drawing); a cylinder 5 which slidably supports the plunger; a core 6 which secures the upper end of the cylinder 5 and one end of which is in the interior of the cylinder to oppose the above-mentioned plunger 4; a winding 8 wound on and around a bobbin 7 which is disposed on the circumference of the cylinder 5 so that it may cooperate with the core 6 to attract the plunger 4; a spring 9 which is interposed between the plunger 4 and the core 6 to energize the plunger 4 in the direction opposite to the electromagnetic force owing to the winding 8 and the core 6 (the downward direction in the drawing); and a spring 18 which energizes the plunger 4 in the direction of the electromagnetic force (the upward direction in the drawing) by way of the spool 17.

Each of these component parts is housed and disposed in a space formed by a casing 10 in the shape of an inverted tumbler glass or the like with its open end facing downward and a spacer 11 to close the open end of the casing. By the way, the spacer 11 has at the substantially center part thereof an opening 11a, through which the lower end of the cylinder 5 is to pass. Further, in FIG. 3, a reference numeral 12 designates a threaded screw for fixedly securing the upper end part of the core 6 to the side of the casing 10.

On the other hand, the flow-rate control section 3 has a body 13 joined to the outside of the spacer 11 and to the side of the above-mentioned electromagnetic control section 2 in its axial direction. Further, in the axial direction of the body 13, there are formed in series a holding bore 13a of a large diameter for housing and perforating the bottom end part of the cylinder 5 with the plunger 4 being accommodated therein; a small bore 13b, into which is positioned a sleeve 14, and which is formed in continuity with the large bore 13a and slidably supporting the spool 17; and a communicating bore 13c which is continuous with the small bore and open to the lower end of the body 13. In addition, at the bottom end and the lateral part of this body 13, there are fixedly provided tube bodies 15 and 16, one of which (the tube body 15) is connected to the communicating port 13c of the body 13, and the other of which (the tube body 16) is connected to the small bore 13b, where the above-mentioned sleeve 14 is to be fitted, with its end being open to a part of the peripheral wall part thereof. In the outer peripheral wall part of the sleeve 14 fitted into the small bore 13, there is formed a slit 14a in the axial direction so as to be communicatively connected with the fluid passage-way formed by the tube body 16. The opening area of this slit 14a is determined by its being opened and closed by the spool 17 which slides within the sleeve 14, as the consequence of which the flow-rate of the fluid flowing in this part is controlled.

The above-described electromagnetic control section 2 and flow-rate control section 3 are positioned in their axial direction by the lower outer peripheral part of the cylinder 5, in which the plunger 4 is housed, and the inner peripheral part of the holding bore 13a of the body 13, and are fixedly assembled.

In the following, explanations will be given as to the function of this conventional electromagnetic proportional control valve. When electric current is caused to pass through the winding 8, the electromagnetic force (force of attraction) commensurate with the input current acts on the plunger 4 by way of a magnetic circuit constructed by the casing 10, the core 6, the spacer 11 and the plunger 4, and the plunger 4 moves to a position where this electromagnetic force and an energizing force of the spring 9 and the spring 18 interposed between the plunger 4 and the core 6, together with the movement of which the spool 17 which slides within the sleeve 4 control the slit 14a to open and close, whereby the flow-rate of the fluid is controlled to a desired quantity.

In FIG. 3, the fluid which has been forwarded under pressure from the arrowed direction (leftward direction in the drawing) passes through the slit 14a, after which it is reduced its pressure, and flows in the arrowed direction (downward direction in the drawing). At that time, both discharge chamber 20 and air-gap chamber 19 are communicatively connected by pressure levelling ports 4a and 17a.

The conventional electromagnetic control valve 1 as described in the foregoing has its own disadvantage such that, even when the spool 17 reaches its condition for perfectly closing the slit 14a at the time of non-conduction of the electric current through the winding, there unavoidably exists between the sleeve 14 and the spool 17 a gap for permitting the spool 17 to slide within the sleeve 14 in the up-and-down direction, on account of which the fluid to be controlled leaks out, thereby making it impossible to perfectly prevent the fluid to be controlled from leaking through this gap. Moreover, in order to prevent the fluid from leaking, it was contemplated to provide an electromagnetic valve for closure in front of the tube body 16 in the fluid influent section, in which case, however, there arose such a problem that number of the component parts increased, and, at the same time, its manufacturing cost became high.

SUMMARY OF THE INVENTION

The present invention has been made with a view to effectively solving the above-mentioned problems, and aims at providing an electromagnetic proportional control valve capable of preventing the fluid to be controlled from leaking.

The electromagnetic proportional control valve according to the present invention is so constructed that it comprises a sleeve; a spool slidably held within the sleeve; a spring holder to move with the spool; a ball mounted in the spring holder and lifted up thereby; and a valve seat inserted under pressure into the sleeve, wherein the ball is brought into tight contact with the valve seat by the energizing force of the spring.

BRIEF DESCRIPTION OF THE DRAWINGS

One way of carrying out the invention is described in detail below with reference to drawings which illustrate one specific embodiment thereof, in which.

DETAILED DESCRIPTION OF THE PREFERRED EMBODIMENTS

In the following, explanations will be given in reference to the accompanying drawing as to a preferred embodiment of the present invention.

Figure 1:
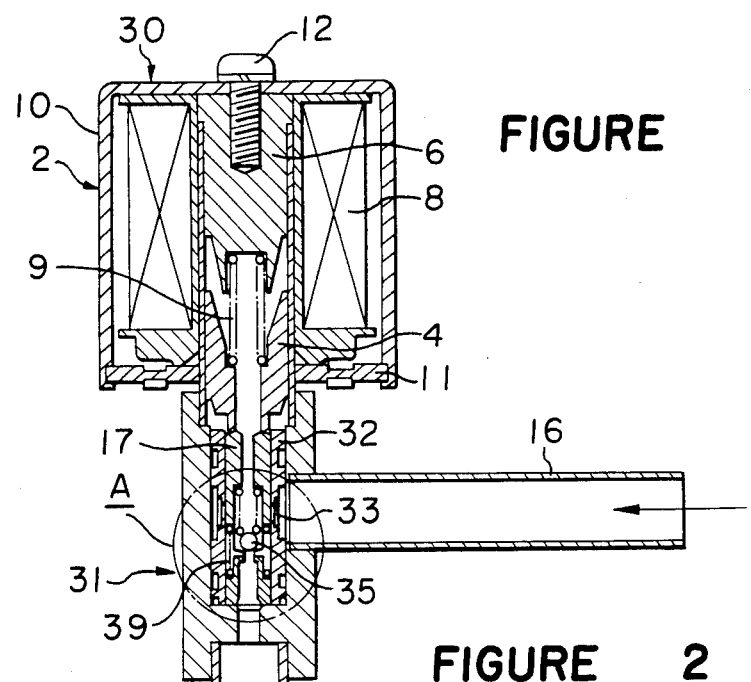
FIG. 1 is a side elevational view partly in longitudinal cross-section of the electromagnetic proportional control valve according to the present invention.
Figure 2:
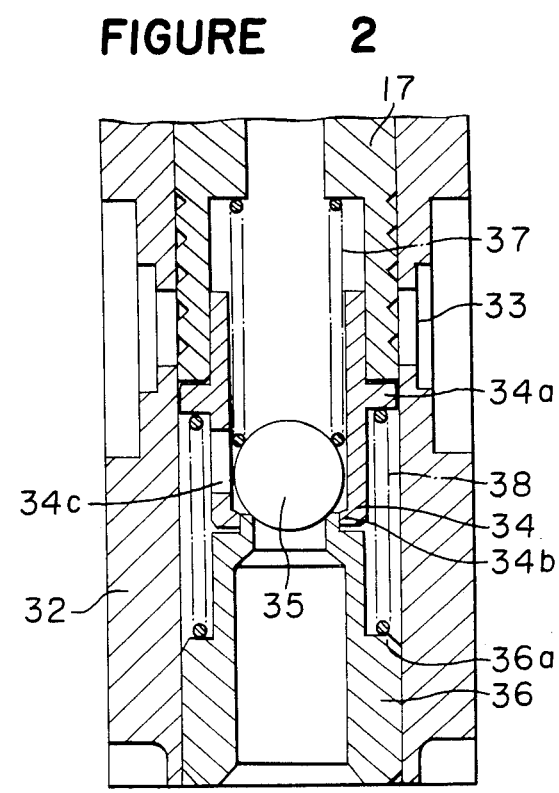
FIG. 2 is an enlarged view in longitudinal cross-section showing in detail the encircled portion (A) in FIG. 1.
Figure 3:
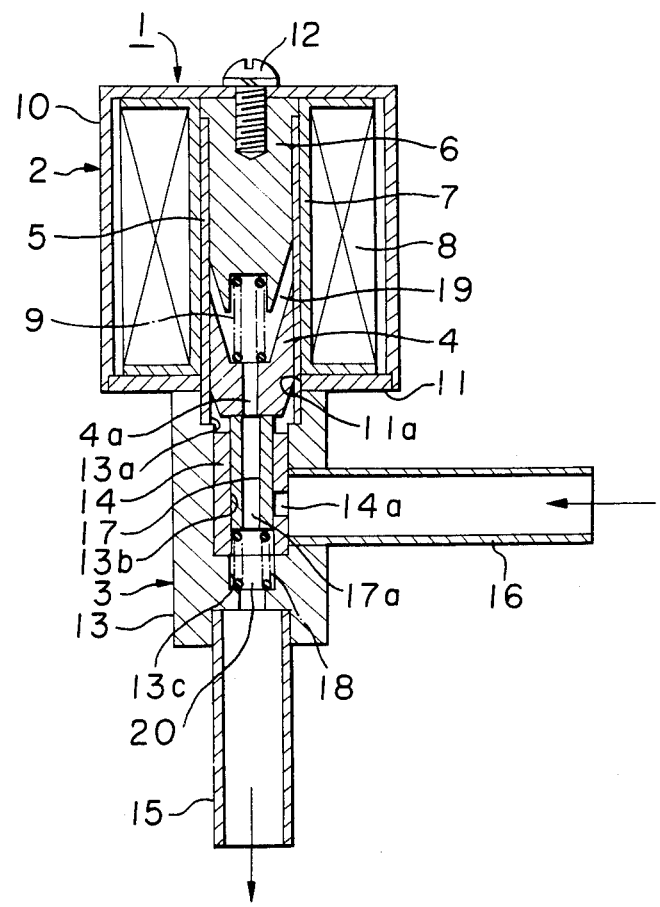
FIG. 3 is a side elevational view partly in longitudinal cross-section of the electromagnetic proportional control valve according to the conventional example.

FIG. 1 is a side elevational view in longitudinal cross-section showing the electromagnetic proportional control valve according to the present invention; and FIG. 2 is an enlarged view partly in cross-section showing in detail the encircled portion (A) in FIG. 1. Incidentally, it should be noted that, in FIGS. 1 and 2, the same or corresponding parts to those of the conventional electromagnetic proportional control valve as shown in FIG. 3 are designated by the same reference numerals, and the explanations thereof will be dispensed with.

The electromagnetic proportional control valve 30 according to this embodiment of the present invention comprises an electromagnetic control section 2 having the same construction as that in the conventional control valve and a flow-rate control section 31 of an improved construction. This flow-rate control section 31 is constructed with a sleeve 32; a spool 17 which is slidably supported within the sleeve 32; a spring holder 34 cooperating with the spool 17; a ball 35 fitted within the spring holder 34; and a valve seat 36. The spool 17 extends at its lower end up to a position where the slit 33 is closed when no electric current passes through the winding 8, and its inner bore has a cylindrical portion having an enlarged diameter at its lower end thereof. The spring holder 34 is fitted in this lower inner bore of the spool 17. The spring holder 34 is a cylindrical body having an outer diameter corresponding to the enlarged inner diameter of the spool 17, and has, at its intermediate portion, an outer flange 34a which is in close contact with the lower end of the spool 17 and which has an inwardly extending annular projection 34b at the lower end of the spool 17. This annular projection 34b has its inner diameter slightly smaller than the diameter of the metal ball 35 to be placed in the inner bore of the spring holder 34. Between this ball 35 and the downward stepped part of the enlarged diameter portion of the spool 17, there is interposed a coil spring 37 so as to push the ball downward. Incidentally in the side wall at a position near the ball 35, there is formed an opening 34c. The valve seat 36 is fitted in the inner bore part of the sleeve 32 below the spring holder 34. The valve seat member 36 has a valve seat surface extending in the inwardly extending annular projection 34b of the spring holder 34, and is so constructed as to prevent the fluid from leaking by the contact between the ball 35 and the valve seat surface. The valve seat member 36 has a through-hole extending from the valve seat surface to the bottom part, and a diameter portion which is reduced relative to the outer diameter part. Between the upwardly facing shoulder part 36a of this diameter portion and the outer flange 34a of this spring holder 34, there is interposed the spring 38.

With the electromagnetic proportional control valve 30 of the above-described construction, when the electric current is caused to pass through the winding 8, electromagnetic force commensurate with the input current acts on the plunger 4 through the magnetic circuit constructed with the casing 10, the core 6, the spacer 11 and the plunger 4, whereby the spool 17 moves to the position where the electromagnetic force and the energizing force of the springs 9, 37 and 38 become equilibrated. At the same time, the spring holder 34 lifts up the ball 35 and moves together with the spool 17. As soon as the spring holder 34 completes lifting of the ball 35, the slit 33 formed in the sleeve 32 opens, and the fluid to be controlled flows out through the opening of the slit 33. This fluid further flows out from the opening between the ball 35 and the valve seat 36.

On the other hand, during non-conduction of the electric current, the slit 33 formed in the sleeve 32 is closed by the spool 17, while the ball 35 is tightly fitted on the valve seat 36. At this instant, energizing force of the spring 37 and force from the fluid pressure in the high pressure part both act on the ball 35, whereby the ball 35 is perfectly and tightly fitted with the valve seat, and the fluid to be contolled is completely shut between th high pressure part and the low pressure part. As the consequence of this, leakage of the fluid to be controlled through the gap between the sleeve 32 and the spool 17 can be prevented.

As is apparent from the foregoing explanations, the electromagnetic proportional control valve according to the present invention is so constructed that the ball is brought into tight contact with the surface of the valve seat by the energizing force of the springs and the force from the fluid pressure, on account of which the ball carries out the function of the sealing, and the possible leakage of the fluid to be controlled, which has occurred in the conventional electromagnetic proportional control valve, can thus be prevented.

We claim:

1. An electromagnetic proportional control valve comprising:
   a control valve main body having fluid inlet means and fluid outlet means;
   a sleeve in said main body and having a slit in communication with said inlet means;
   a valve seat in said sleeve at a position such that a fluid passageway is defined from said inlet means through said slit, said valve seat and said outlet means, respectively;
   a spool slidably fitted in said sleeve;
   electromagnetic means connected to said spool for moving said spool to selectively close said slit in said sleeve, such that said spool comprises means for varying an opening area of said fluid passageway, whereby fluid flow through said passageway may be controlled;
   a ball movable with said spool and comprising means for sealingly matingly engaging with said valve seat when said spool is in a position for fully closing said slit; and
   spring means for pressing said ball into tight mating engagement with said valve seat when said spool is in said position for fully closing said slit.

2. An electromagnetic proportional control valve according to claim 1, wherein said spool includes a spring holder in a cylindrical form, said spring holder being so constructed that said ball is movably held in the inner bore thereof.

3. An electromagnetic proportional control valve according to claim 2, wherein said valve seat has a valve seat surface facing a lower end part of said spring holder.

4. An electromagnetic proportional control valve according to claim 2 including a second spring interposed between said spring holder and said valve seat so as to constantly urge said spring holder in the upward direction.

* * * * *